Sept. 9, 1952 D. B. ROSSHEIM 2,609,595
METHOD OF FORMING LAMINATED PRESSURE VESSELS
Filed May 18, 1948 3 Sheets-Sheet 1

INVENTOR.
DAVID B. ROSSHEIM
BY *Virgil F. Davies*
*Albert P. Davis*
ATTORNEYS

Sept. 9, 1952 D. B. ROSSHEIM 2,609,595
METHOD OF FORMING LAMINATED PRESSURE VESSELS
Filed May 18, 1948 3 Sheets-Sheet 2

INVENTOR.
DAVID B. ROSSHEIM
BY
ATTORNEYS

Sept. 9, 1952    D. B. ROSSHEIM    2,609,595
METHOD OF FORMING LAMINATED PRESSURE VESSELS
Filed May 18, 1948    3 Sheets-Sheet 3

INVENTOR.
DAVID B. ROSSHEIM
BY Virgil F. Davies
Albert P. Davis
ATTORNEYS

Patented Sept. 9, 1952

2,609,595

UNITED STATES PATENT OFFICE 2,609,595

METHOD OF FORMING LAMINATED PRESSURE VESSELS

David B. Rossheim, Teaneck, N. J., assignor to The M. W. Kellogg Company, Jersey City, N. J., a corporation of New Jersey Application May 18, 1948, Serial No. 27,805

5 Claims. (Cl. 29—148.2)

This invention relates to the manufacture of pressure vessels, and more particularly relates to methods of manufacturing multi-layer pressure vessels adapted for industrial use and capable of withstanding high pressures.

Prior to the present invention, several different methods have been employed to fabricate high pressure vessels. These methods included forging the vessel from a single ingot; laminating a plurality of concentric layers for forming one layer upon another; spirally winding a long sheet of metal to build up a plurality of layers; reinforcing an inner shell by means of windings of wire, cable, or strapping; making up a plurality of shells, the shells being separately formed and after formation being assembled to form the vessel.

All of these prior methods presented certain disadvantages. For example, forging is extremely expensive and time consuming, requires heavy and expensive equipment and highly skilled labor. When the pressure vessels are fabricated by forming concentric layers one upon another and by spirally winding a sheet of metal, only relatively short lengths can be made; also it is extremely difficult, if not impossible, to inspect the welds by X-ray, and furthermore it is very difficult to accurately pre-stress the various layers. Windings of wire, cable, or strapping normally impart no longitudinal strength to the vessel, and if they are formed to interlock so that they will add longitudinal strength their formation and application becomes an expensive and highly skilled operation. In the past when pressure vessels were assembled from separately formed shells it was extremely difficult, if not impossible, to pre-stress the various layers with any degree of accuracy and furthermore it was often necessary to machine the inner and outer surfaces of each shell to close tolerances to insure assembly and support of the inner shells by the outer shells.

The present invention is an improvement of the method wherein a plurality of shells are separately formed and then assembled to form a multi-layer vessel. In practicing the present invention any degree of pre-stress is easily and accurately obtained in any of the layers; it is not necessary to machine any of the surfaces of any of the shells; the vessels can be fabricated in relatively long lengths thus eliminating the need, in most applications, to weld a plurality of fabricated lengths together; the welds, if any, in each shell can be accurately and completely inspected before assembly, and each layer of the assembly adds to the longitudinal strength of the vessel. In addition to these advantages the method is relatively fast and economical.

One object of the present invention is to provide a method for the manufacture of multi-layer pressure vessels whereby predetermined stresses can be accurately established in predetermined layers.

Another object of the present invention is to provide a method for the manufacture of multi-layer pressure vessels wherein a plurality of shells are fabricated separately and assembled one over the other and whereby any predetermined degree of stress can be accurately established in any layer.

Another object of the present invention is to provide a method for the manufacture of multi-layer pressure vessels by fabricating a plurality of shells separately and assembling said shells one over the other wherein it is not necessary to machine said shells before assembly and whereby any predetermined degree of stress can be accurately established in any layer.

Another object of the present invention is to provide a method for the manufacture of multi-layer pressure vessels by providing a plurality of shells and assembling said shells successively one over the other wherein it is not necessary to machine said shells before assembly and whereby the interface surfaces of said shells are brought into face-to-face contact by successively drawing predetermined areas of one or more of said shells.

Another object of the present invention is to provide a method for the manufacture of multi-layer pressure vessels by providing a plurality of shells and assembling said shells successively one over the other wherein it is not necessary to machine said shells before assembly and whereby the interface surfaces of said shells are brought into face-to-face contact by successively upsetting predetermined areas of one or more of said shells.

Another object of the present invention is to provide a simple, accurate, and inexpensive method of manufacturing multi-layer pressure vessels.

Other objects of the invention will in part be obvious and will part appear hereinafter.

The invention accordingly comprises the process involving the several steps, and the relation and order of one or more of such steps with respect to each of the others which are exemplified in the following detailed disclosure and the scope of the application of which will be indicated in the claims.

For a fuller understanding of the nature and objects of the invention, reference should be had to the following detailed description taken in connection with the accompanying drawing wherein.

The process of the present invention comprises the steps of providing two or more shells capable of being concentrically assembled one within the other, assembling two of the shells one within the other, and causing their interface surfaces to be progressively brought into face-to-face contact with each other. The shells can be progressively brought into face-to-face contact by successively heating relatively narrow circumferential bands on the outside shell and successively subjecting the areas thus heated to an axial tension to draw said heated portions and thus progressively cause the diameter of the shell to be reduced. The shells can also be progressively brought into face-to-face contact by successively heating relatively narrow areas of either the outer shell or the inner shell and successively subjecting the areas thus heated to a compressive force to cause said areas to be upset a predetermined amount to progressively reduce the internal diameter and increase the outside diameter of the shell being upset.

The above mentioned areas, whether circumferential bands or longitudinal areas, are heated to a temperature at which the material from which the shell is formed is relatively plastic and is capable of a uniform plastic flow when subjected to a predetermined tensile or compressive loading. The areas are so heated that they are substantially the same temperature throughout their width, and the temperature is so controlled that there is an abrupt temperature drop in the material adjacent thereto, so that said adjacent material has sufficient rigidity to withstand the stress to which the shells are subjected without permanent deformation.

The areas heated are narrow so that a high degree of control over the plastic flow of the heated material is possible at all times. This makes possible the prevention of undesired distortion such as localized thinning out of the shell, buckling, or uneven upsetting, and also makes it possible to heat said areas evenly and accurately.

The individual shells can be fabricated in any desired manner, as for example, by forging, or by bending flat plates into cylindrical form and welding their abutting edges together, or if desired prefabricated pipe or tubing can be used. It is not necessary that the various shells be machined; it is only necessary that they be fabricated to reasonable close tolerances and that the welds, if any, be dressed smooth. Inasmuch as each shell is fabricated before it is assembled in the pressure vessel, it is possible to inspect all welds and other portions of each shell thoroughly to insure maximum strengths in each shell. All of the shells can be stress relieved and/or heat treated before being assembled on the pressure vessel.

Figure 1:
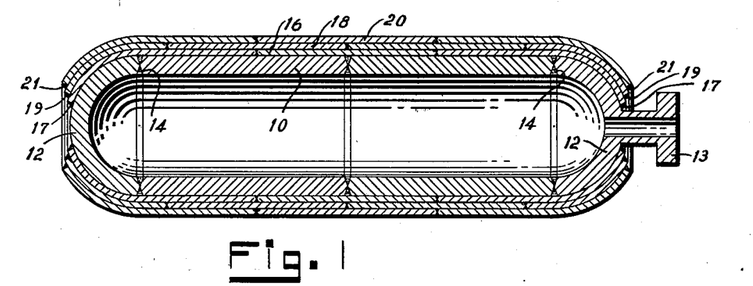
Fig. 1 is a longitudinal sectional view of a multi-layer pressure vessel made by the method of the present invention.

Fig. 1 is a longitudinal sectional view of a multi-layer pressure vessel fabricated by the process of the instant invention. The pressure vessel comprises an inner shell 10 having a pair of hemispherical ends or heads 12 attached thereto by circumferential welds 14. Either one of the heads 12, or both of them, can be provided with a connector 13. Inner shell 10 and a portion of each of the heads 12 are encompassed by tightly fitting outer layers 16, 18 and 20. Each of the layers 10, 16, 18 and 20 in the completed vessel are preferably pre-stressed so that they are under a predetermined condition of circumferential compression or tension. For example, the pressure vessel of Fig. 1, preferably has layers 10 and 16 under circumferential compression and layers 18 and 20 under circumferential tension so that each layer, when the vessel is subjected to its working pressure, will withstand its proportional share of said pressure. Inner shell 10 and heads 12 can be formed from any material having the desired properties for the service for which the vessel is intended as, for example, stainless steel. The outer layers 16, 18 and 20, which are not in contact with the contents of the vessel, can be formed of less expensive material having the necessary strength.

When a hemispherical head is employed it is preferably designed and constructed to have a thickness sufficient to withstand the total stress to which it will be subjected, with its outside diameter substantially equal to the outside diameter of inner shell 10. If the thickness of such a head is greater than the thickness of the inner shell 10, its inner surface can be faired off so that its edges are substantially the same thickness as the thickness of the inner shell 10. Outer shells 16, 18 and 20 are longer than inner shell 10. The ends of these outer shells where they extend beyond the inner shell 10 are shaped, as by heating and applying pressure, so that the ends of shell 16 lie against the outer surfaces of heads 12 and are welded thereto by welds 17, and the ends of shells 18 and 20, respectively, lie against the outer surfaces of layers 16 and 18, respectively, and are welded thereto by welds 19 and 21. The ends of the shells 16, 18 and 20 can be made to extend over any desired length of the heads 12.

If material has been removed from the heads 12 to fair them off, the ends will extend over said heads 12 a sufficient distance to reinforce them in those areas where material has been removed. The ends of shells 16, 18 and 20 also assist the welds 14 to withstand the axial load to which they are subjected by reason of pressure exerted on said heads 12 by the contents of the vessel.

Figures 2, 3:
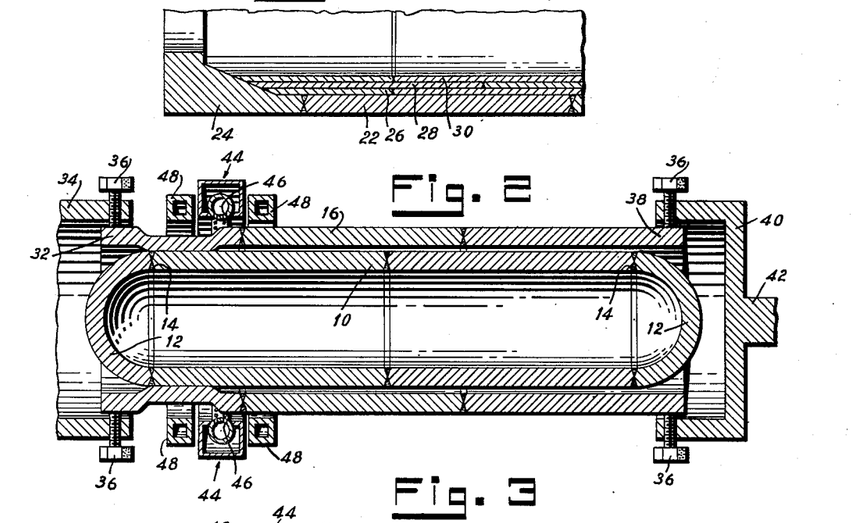
Fig. 2 is a fragmentary sectional view of another type of multi-layer pressure vessel made by the method of the present invention.
Fig. 3 is a diagrammatic longitudinal sectional view showing a layer in the process of being assembled on a partly fabricated pressure vessel by being drawn to reduce its diameter.

Fig. 2 is a fragmentary sectional view of a different type of multi-layer pressure vessel fabricated by the process of the instant invention. The pressure vessel of Fig. 2 comprises an outer shell 22 having heads 24 welded thereto, and a plurality of reinforcing shells 26, 28 and 30 located inside of shell 22.

It will be understood, however, that the present invention is not limited to the manufacture of multi-layer vessels comprising four layers, but that it may be employed to manufacture vessels having any desired number of layers. It will also be understood that any desired type of head can be incorporated in the multi-layer pressure vessels, and that the heads can be welded or otherwise attached to the cylindrical body of the vessel after it has been fabricated.

Fig. 3 discloses the multi-layer pressure vessel of Fig. 1 in the process of being manufactured by one modification of the present invention. In the modification disclosed the outer shell 16 is being brought into face-to-face contact with the inner shell 10 by being drawn to reduce its diameter.

After the inner shell 10 has been fabricated, heads 12 are welded to its ends, the welded joints therein are ground smooth, all desired inspections are performed and the entire unit may be stress relieved and/or heat treated in any desired manner. Outer shell 16 is next fabricated, its welded joints are ground smooth and the entire shell is inspected and, if desired, stress relieved and/or heat treated in any desired manner. Shell 16 is fabricated to have an inner diameter as nearly the same as the external diameter of the inner shell 10 as possible and still be able to slip over shell 10.

If it is desired to fabricate a pressure vessel of greater length than the length of plate material available for forming the various shells thereof, or longer than available lengths of pipe, a plurality of short shells can be welded together, end to end, before the different layers are assembled together, to obtain shells of the desired length. If this is done each weld will preferably be ground smooth, inspected, and repaired if necessary, before the layers are assembled one over the other.

Shell 16 is slipped over inner shell 10 and positioned with respect to shell 10 so that the end 32 extends beyond one end of shell 10 the distance it is desired to have said shell 16 overlie and reinforce head 12. End 32 is next securely attached to a jig or fixture 34 by means of lugs 36, or any other conventional fastening means. Fixture 34 is rigidly and firmly attached to any solid relatively immovable object (not shown) capable of withstanding an extremely high pulling load. The other end 38 of shell 16 is similarly attached by means of lugs 36 to a jig or fixture 40 which is connected by means of shaft 42 to a hydraulic cylinder (not shown) or any other mechanism for subjecting the shell 16 to a high degree of tension.

A ring burner 44 having, or forming, a plurality of oxyacetylene orifices or nozzles 46, extends around the shell 16 and is capable of being moved longitudinally along said shell 16. The nozzles 46 carried, or formed, by ring 44 are evenly and closely spaced around said ring 44, and can be spaced thereon in a plurality of rows so that the burner will heat a band of the desired width while remaining stationary, or the ring can be oscillated back and forth along shell 16 to heat the desired width of band. The burner 44 is of such a diameter that nozzles 46 are adjacent to but spaced from the outer surface of shell 16 so that they can efficiently and evenly heat throughout its width a predetermined circumferential narrow band of shell 16. Cooling rings 48 are located on each side of ring 44 and function to keep the shell 16, on each side of the circumferential area heated by ring 44, cool enough to resist permanent deformation by the above mentioned tension. It is preferred that the ring burner 44 comprise a heating means similar to the oxyacetylene heating means disclosed in the copending application Serial Number 679,900 of David B. Rossheim et al., filed June 28, 1946, for Method of Shaping Thermoplastic Bodies, now issued as Patent Number 2,480,774. However, any means, as for example, high frequency induction heaters or resistance heaters, capable of evenly and rapidly applying a large amount of heat to a predetermined narrow area may be employed. It is also preferred that cooling rings 48 be similar to the cooling means disclosed in the above mentioned copending application Serial Number 679,900, now Patent No. 2,480,774, but any other suitable cooling means, as, for example, solid metal rings or water spray, may be used.

After shell 16 is attached to fixtures 34 and 40, ring burner 44 is moved adjacent to fixture 34 or to a point opposite weld 14 and the oxyacetylene nozzles 46 are ignited to heat a narrow circumferential band of predetermined width on shell 16 to a predetermined temperature at which the desired degree of plasticity is attained. When shell 16 is formed of low carbon steel, it has been found that heating the circumferential bands to approximately 1400° F. results in said bands attaining the desired degree of plasticity. When the desired temperature is attained, ring burner 44 and cooling means 48 are slowly moved towards end 38 at such a rate that said burner will constantly have under its flame a circumferential band of the predetermined width which is at substantially the predetermined desired temperature throughout its width. It may be necessary, or desirable, to heat and cool the first circumferential band several times, in the manner set forth in the above mentioned copending application, Serial Number 679,900, now Patent No. 2,480,774 before the burner 44 is moved. This may be necessary, or desirable, as explained in copending application, Serial Number 679,900, now Patent No. 2,480,774, to raise the temperature of the material on each side of the circumferential band to the temperature that it will be at after the process has been in operation a period of time and has reached equilibrium. As soon as the desired temperature is attained, a predetermined tensile load is applied to the shell 16 through the fixture 40 by means of the above mentioned hydraulic cylinder, or other means, to cause a uniform plastic flow to take place in the material comprising the heated area of shell 16 whereby said area is elongated and at the same time reduced in diameter. The elongation and reduction in diameter causes the inner surface of shell 16 to be brought into contact with the outer surface of shell 10. The predetermined tensile load is maintained on shell 16 as ring burner 44 advances from end 32 to end 38 so that the elongation and reduction in diameter or shell 16 takes place continuously.

Figure 4:
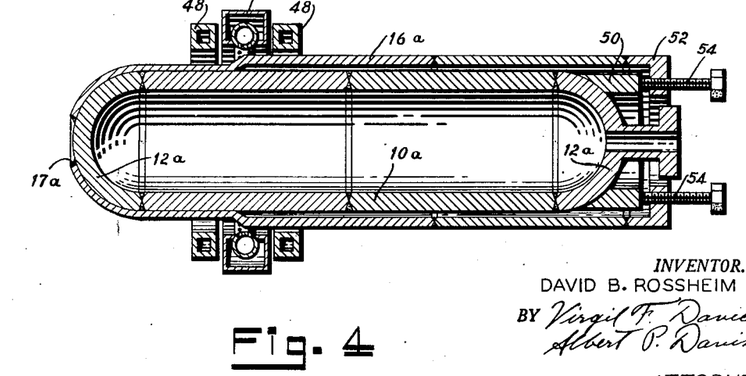
Fig. 4 is a diagrammatic longitudinal sectional view showing a layer in the process of being assembled on a partly fabricated pressure vessel by being drawn in a different manner to reduce its diameter.

Fig. 4 illustrates another manner in which the outer layers can be applied to the inner shell by drawing each outer shell to reduce its diameter. Heads 12a, similar to heads 12 of Fig. 3, are welded to inner shell 10a and outer shell 16a is fitted over shell 10a and heads 12a. One end of shell 16a is constricted so that its inner surface conforms to the outer surface of one of the heads 12a, and that end is welded by weld 17a to its adjacent head 12a. The end of shell 16a can be constricted to conform to head 12a either before or after shell 16a is placed over shell 10a. A collar 50 is placed against the other head 12a and a flange 52 is welded to the other end of shell 16a. Flange 52 is threaded to carry a plurality of jacking screws 54 which engage the collar 50. A burner 44 and cooling rings 48, similar to those disclosed in Figs. 3, are provided. When the circumferential band on shell 16a has been heated to the desired temperature, in the manner disclosed in connection with Fig. 3, a longitudinal tensile load is applied to shell 16a by screwing the jacking screws 54 inwardly against collar 50 to cause the heated band to be drawn and reduced in diameter. The tensile load can be maintained substantially constant on shell 16a by moving screws 54 inwardly at a predetermined uniform rate as burner 44 and cooling rings 48 advance along shell 16a. After shell 16a has been reduced in diameter throughout the length of shell 10a so that the two shells are in intimate face-to-face contact, flange 52 is cut from shell 16a and that end of the shell is constricted to engage the outer surface of its adjacent head 12a and is welded thereto.

The predetermined tensile load which is applied to shell 16 or 16a will vary with the wall thickness and diameter of said shell, the reduction in diameter that is desired and the pressure that shell 16 or 16a is to apply to shell 10 or 10a. It will be apparent that the circumferential band can be heated to a temperature higher or lower than 1400° F. if it is so desired. If a higher temperature is employed, a smaller tensile load will be applied to the shell. If a lower temperature is employed, a greater tensile load will be applied to the shell. However, the temperature cannot be lowered to a point where the necessary tensile load will cause a permanent deformation in the material adjacent to the heated band.

The width of the circumferential band which is heated is as narrow as possible consistent with obtaining the desired reduction in diameter thereof and the desired pressure on shell 10 or 10a. By so doing, the plastic flow of the material comprising the heated circumferential band is under substantially complete control at all times, thus permitting shell 16 or 16a to be progressively brought into contact with shell 10 or 10a in small increments, thus insuring complete contact of all interface areas on the two shells, and making possible the avoidance of localized thinning out and undesired distortion. It has been found that best results are obtained when the width of the heated band is equal to or slightly greater than the thickness of the shell. However, in cases when shells 16 or 16a are formed of thin material, this condition cannot be obtained due to mechanical limitations of the heating means and satisfactory results can be obtained with a heated band of greater relative width.

Whereas, it is preferred to continuously advance ring burner 44 while at the same time continuously applying a tensile load to shells 16 or 16a, it will be understood that the process can be carried out by intermittently heating a circumferential area of said shells followed by the application of a tensile load to the shell to elongate and reduce the diameter thereof in the heated area, followed by heating a succeeding, or slightly overlapping, area and reducing said succeeding area. It will also be understood that the tensile load can be applied to shell 16 or 16a before the circumferential area thereon has attained the desired temperature and maintained until said temperature is reached and the desired elongation and reduction in diameter obtained. Also, the heating can be started at any point on shell 16 that is between the ends of shell 10 and continued first in one direction and then the other to bring the interface surfaces into contact with each other.

It will also be appreciated that any desired predetermined circumferential tension can be established in shell 16 or 16a by controlling the tension to which said shell is subjected and thus controlling the pressure exerted thereby on shell 10 or 10a due to the reduction in diameter of shell 16 or 16a.

Shells 18 and 20 can be applied over shells 16 or 16a and 18 respectively in the same manner that shell 16 or 16a is applied to shell 10. Any desired number of shells can be built up in this manner, and the stress that each succeeding shell exerts on the inner shells can be accurately predetermined, as above described, by varying the tensile load employed to reduce their diameter. Preferably, each succeeding shell is applied so that it exerts a greater circumferential pressure on the preceding shell than said preceding shell exerted on its own preceding shell. Thus, it is possible to fabricate a multi-layer pressure vessel wherein a predetermined number of the inner layers are under circumferential tension, said tension and compressions being of such magnitudes that the maximum strength of each layer of the vessel is fully utilized to withstand the pressure contained by the vessel.

Figure 5:
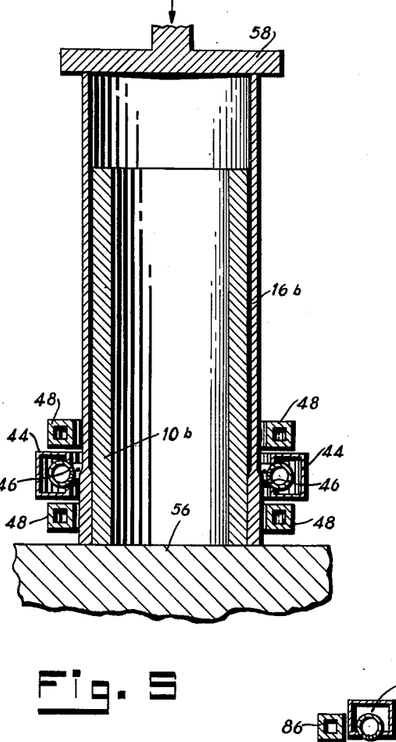
Fig. 5 is a diagrammatic longitudinal sectional view showing a layer being assembled on a partly fabricated pressure vessel by upsetting circumferential increments of said layer.

Fig. 5 illustrates another embodiment of the present invention wherein each succeeding outer shell of a multi-layer pressure vessel is applied thereto by successively upsetting predetermined circumferential areas of each shell. After inner shell 10b has been fabricated and inspected it is placed in a vertical position upon an anvil or rigid base 56, and shell 16b is placed around shell 10b and also rested on anvil 56. Shell 16b is of greater length than inner shell 10b, and therefore its upper end extends beyond the end of shell 10b, and is engaged by piston 58 which is attached to a hydraulic press (not shown) or other means for applying a longitudinal compressive load to shell 16b. Ring burner 44 carrying orifices or nozzles 46, and cooling rings 48, surround shell 16b.

Ring burner 44 is placed adjacent the lower end of shell 16b, the nozzles are ignited and permitted to heat a narrow circumferential band of predetermined width on 16b. This band is heated, for similar materials, to the same temperature as the modification of Fig. 3, i. e., to approximately 1400° F. It may be necessary, or desirable, to heat and cool the first circumferential band several times, in the manner set forth above in connection with Fig. 3, to raise the temperature of the material adjacent the heated band to the temperature that it will be at after the process has been in operation a period of time and has reached equilibrium. When the desired temperature has been attained, ring burner 44 and cooling means 48 are moved slowly upward towards piston 58 at such a rate that said burner will constantly have under its flame a circumferential band of the predetermined width which is at substantially the predetermined desired temperature throughout its width. As soon as the circumferential band reaches the desired temperature and at the same time that ring burner 44 is started moving, a predetermined longitudinal compressive load is applied to shell 16b through piston 58 by means of the above mentioned hydraulic press, or other means, to cause a uniform plastic flow to take place in the material comprising the heated band whereby said band is upset. The predetermined compressive load is maintained on shell 16b as ring burner 44 advances along shell 16b, and the pressure thus applied causes the upsetting of said shell 16b, to take place continuously, thus successively thickening predetermined areas of the walls of shell 16b and decreasing the inside diameter thereof and causing the inner surface thereof to press against the outer surface of shell 10b.

It is preferred to continuously advance ring burner 44 while at the same time continuously applying a compressive force to shell 16b thus making the upsetting a continuous operation. However, it will be understood that the upsetting can be carried out intermittently by heating a circumferential area of shell 16b followed by the application of the compressive force to upset the heated portion, followed by heating and upsetting an adjacent, or slightly over-lapping area, and so on until the full length of shell 16b has been upset. Also the heating can be started at any point on shell 16b that is between the ends of shell 10b and continued first in one direction and then the other to bring the interface surfaces into contact with each other.

It is important in practicing this modification of the invention that the only substantial permanent deformation of shell 16b be upsetting which is the result of plastic flow. Due to practical considerations it is almost impossible to upset relatively long lengths of shell 16b, or any subsequent shell in one step, without buckling occurring. It was disclosed in the above mentioned copending application Serial Number 679,900, that thermoplastic materials may be deformed under compression as a result of plastic flow of the material, and substantially complete control maintained over said plastic flow so that substantially no deformation from buckling results, if the width of the area heated is from one-half to one-quarter, and less, the natural buckling wave length of the material being deformed at the temperature to which the area is heated. This principle is employed in the present invention to give substantially complete control of the plastic flow of the material comprising the shell being upset. Therefore, the circumferential band that is heated on shell 16b is preferably from one-half to one-quarter, and less, the natural buckling wave length of the material of said shell 16b at the temperature to which the band is heated. It is preferred to keep the width of the heated band less than one-half the buckling wave length whenever possible inasmuch as heated bands wider than this permit a slight amount of buckling. The amount of buckling, however, does not become objectionable until the width of the heated band exceeds three-quarters of the natural buckling wave length. It is therefore possible, in cases where it is impracticable or undesirable to keep the width of the heated circumferential band less than half the buckling wave length, to heat a circumferential band having a width that does not exceed three-quarters of said buckling wave length.

The cooling rings 48 function in the same manner in this modification as they do in the modification of Fig. 3, i. e., they maintain a sharp drop in temperature between the edges of the heated band and the rest of shell 16b to keep the shell on each side of the heated area cool enough to resist permanent deformation by the above mentioned compression.

The predetermined compressive force which is applied to shell 16b will vary with the wall thickness and diameter of said shell, the amount of upsetting that is desired, and the pressure that shell 16b is to apply to shell 10b. Any predetermined desired circumferential compression can be established in shell 16b by applying the proper compressive force to said shell 16b to bring about the above described upsetting. The amount of upsetting that takes place in the heated circumferential band varies with the compressive force which causes the upsetting. Therefore, the higher the compressive force which is applied longitudinally to shell 16b the greater will be the amount of upsetting, and the more shell 16b is upset the greater is the circumferential compressive force which it exerts on shell 10b. It will be apparent that the circumferential band can be heated to a temperature higher or lower than 1400° F. if it is so desired. If a high temperature is employed, a smaller compressive load will be applied to the shell. If a lower temperature is employed a greater compressive load will be applied to the shell. However, the temperature cannot be lowered to a point where the necessary compressive load will cause a permanent deformation in the material adjacent the circumferential band.

Shells 18 and 20 can be applied to the pressure vessel in the same manner that shell 16b is applied to shell 10b.

Figure 6:
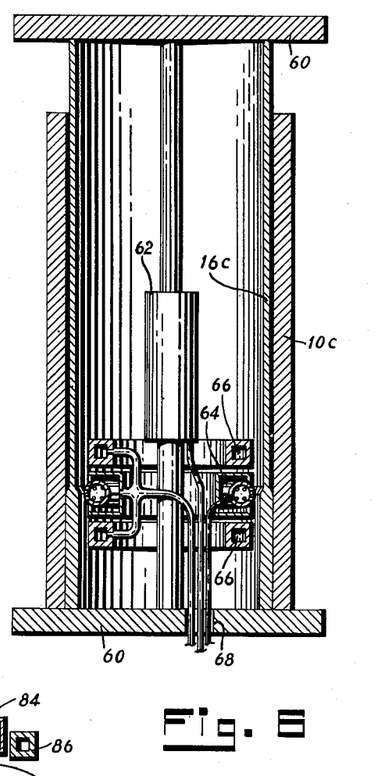
Fig. 6 is a diagrammatic longitudinal sectional view showing a layer being assembled on a partly fabricated pressure vessel by upsetting circumferential increments of said layer in a different manner.

Fig. 6 illustrates the manner in which a multi-layer pressure vessel can be built up by adding layers to the inner surface of a shell. Shells 10c and 16c are fabricated similar to shells 10b and 16b respectively with the exception that shell 10c has a larger diameter than, and is capable of fitting over, shell 16c. The two shells are telescoped and placed between two pressure plates 60 which are connected by means of a hydraulic cylinder 62 capable of drawing the two pressure plates 60 together. A burner 64 and cooling rings 66 are located between the pressure plates 60 and inside of shell 16c. Burner 64 is similar to burner 44 except that its nozzles are arranged on its outer circumference so that said burner 64 will heat the inner surface of shell 16c. Cooling rings 66 are similar to cooling rings 48 except that they are arranged to cool the inner surface of shell 16c. An access opening 68 is provided in one of the pressure plates 60 to provide for the passage of fuel and coolant lines to the burner 64 and cooling rings 66. Burner 64 is located adjacent one end of shell 16c and is ignited and allowed to heat a predetermined circumferential band, similar to the band heated in Fig. 5 to the same temperature as the band in Fig. 5. When the band has been heated to the predetermined temperature, the hydraulic cylinder 62 is actuated to apply a longitudinal compressive load to shell 16c, which, by reason of being longer than shell 10c is in engagement with both plates 60. At the time the compressive load is imposed on shell 16c the burner 64 and cooling rings 66 are started moving slowly along shell 16c so that a band having the predetermined width and temperature is in effect moved along shell 16c. The compressive load acts in the same manner as the compressive load of Fig. 5 and causes the heated band to be upset resulting in an increase in the outside diameter of shell 16c, which in turn results in shell 16c being brought into intimate face-to-face contact with the inner surface of shell 10c.

Figure 7:
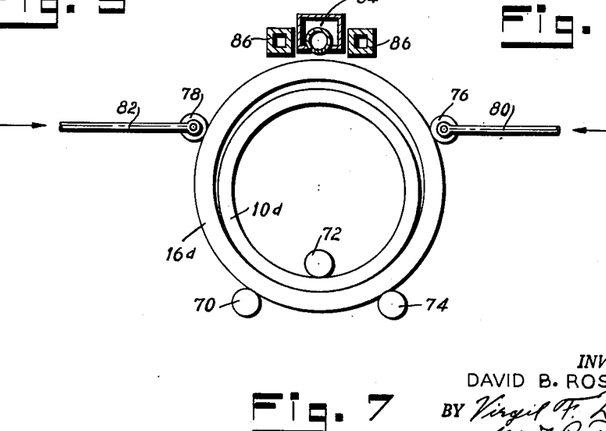
Fig. 7 is a diagrammatic end view showing a layer being assembled on a partly fabricated pressure vessel by upsetting longitudinal increments of said layer; and, Figs. 8 and 9 are diagrammatic perspective views showing a layer being assembled on a partly fabricated pressure vessel by upsetting longitudinal increments of said layer in a different manner.

Fig. 7 of the drawings illustrates the manner in which plate bending rolls are employed to successively upset longitudinal strips along the shell 16d. Inner shell 10d and outer shell 16d are placed between a set of bending rolls 70, 72 and 74, which are supplemented by rolls 76 and 78 carried by arms 80 and 82, respectively. Arms 80 and 82 are connected to hydraulic cylinders (not shown), or any other suitable mechanisms, adapted to move the rolls 76 and 78 towards each other. An elongated oxyacetylene burner 84 is located diametrically opposite roll 72 on the outside of shell 16d and so positioned and of such a length that it can heat a longitudinal strip or area substantially the same width as the width of the circumferential band heated in the modifications of Figs. 5 and 6 throughout the full length of shell 16d.

When this longitudinal strip has been heated to the desired predetermined temperature, which is substantially the same temperature that the circumferential bands in the preceding modifications were heated, roll 72 is moved downwardly with respect to rolls 70 and 74 to apply a bending moment to shell 16d around the point of tangency of shells 16d and 10d. At the same time, rolls 76 and 78 are moved inwardly to supplement and increase the bending moment established by rolls 70, 72 and 74. This bending moment results in a compressive stress being set up in 16d in that portion of 16d which is located above the rolls 70 and 74, and especially in that portion located above rolls 76 and 78. This compressive stress causes shell 16d to be upset a predetermined amount by reason of uniform plastic flow of the longitudinal heated strip. As the initial longitudinal strip attains the desired temperature and rolls 70, 72, 74, 76 and 78 are moved together to apply the bending moment resulting in the above mentioned compressional stress, the rolls 70, 72 and 74 are caused to rotate slowly to cause shells 10d and 16d to slowly rotate. It may be necessary, or desirable, to heat and cool the first longitudinal strip several times before rolls 70, 72, 74, 76 and 78 are moved together, in the manner that the initial circumferential band in Figs. 3 through 6 may be heated and cooled, to raise the temperature of the material adjacent the heated strip to the temperature that it will be at after the process has been in operation a period of time and has reached equilibrium. The speed with which rolls 70, 72 and 74 are caused to rotate is such that shell 16d will be driven at such a speed that there will always be beneath burner 84 a longitudinal strip of the desired width having substantially the desired temperature. As shells 16d and 10d are rotated roll 72 is continuously moved downwardly with respect to rolls 70 and 74 and rolls 76 and 78 continuously moved together so that a constant uniform compressive stress is maintained in that portion of shell 16d which is located above rolls 70 and 74.

It will therefore be seen that by maintaining a constant bending moment on shell 16d by means of rolls 70, 72, 74, 76 and 78, and continuously rotating shell 16d, the upsetting of the longitudinal strips takes place as a continuous operation. It will, however, be understood that the longitudinal strips of shell 16d can be upset intermittently by first heating a strip, setting up a compressive stress in 16d by means of rolls 70, 72, 74, 76 and 78, followed by heating a succeeding strip, and upsetting that, and so on until shell 16d has been upset around its entire circumference.

Cooling bars 86 are located on each side of the burner 84 and function to keep the shell 16d on each side of the longitudinal band heated by said burner 84 cool enough to resist deformation by the above described compressive stress. Cooling bars 86 are preferably hollow water cooled bars, but any other suitable cooling means may be used as, for example, solid metal bars or water spray.

Any number of shells can be applied to the pressure vessel by successively upsetting longitudinal strips thereof by means of bending rolls, and it will be understood that any desired predetermined internal circumferential stress can be set in each of these layers by varying the amount of upsetting by increasing or decreasing the compressive stresses set up by the rolls 70, 72, 74, 76 and 78.

Figure 8:
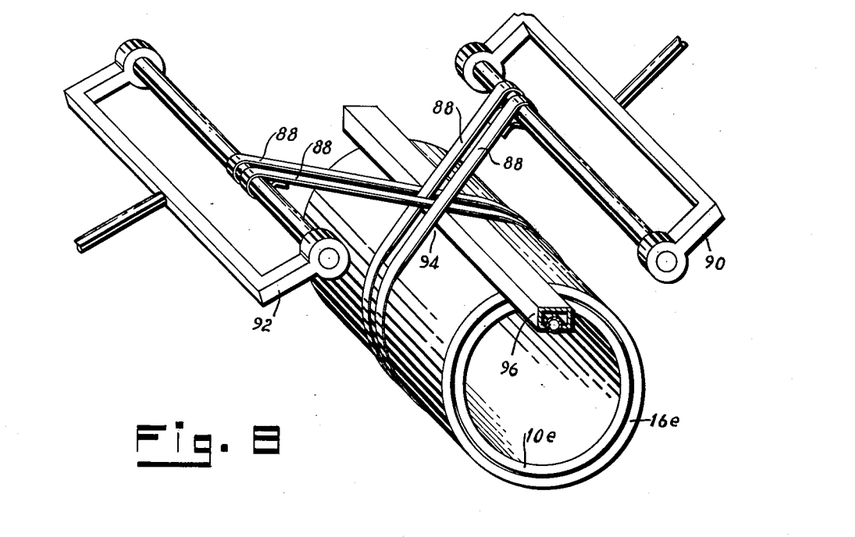
Figure 9:
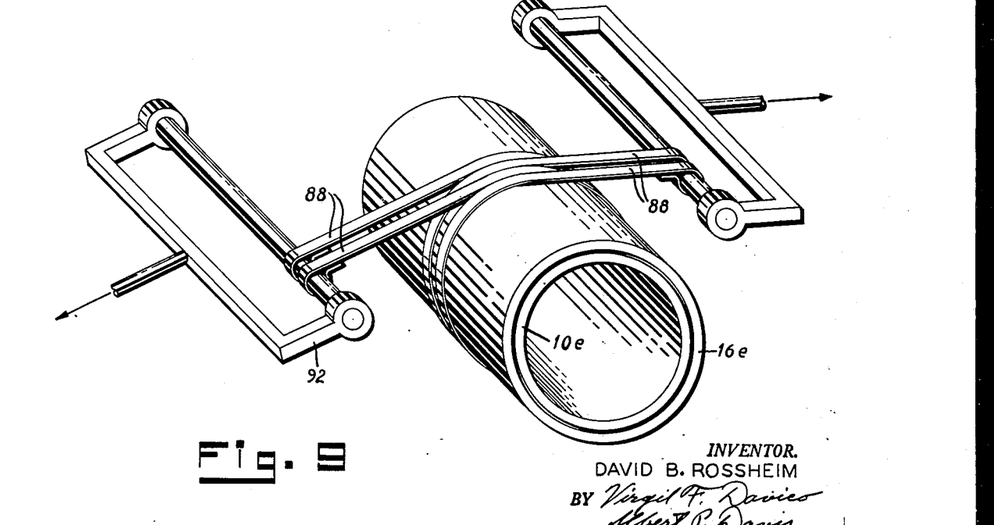

Figs. 8 and 9 illustrate the manner in which a plurality of straps or cables 88 are employed to apply a circumferential compressive force to shell 16e to successively and intermittently upset longitudinal strips thereof.

After shells 10e and 16e have been fabricated and assembled one over the other a plurality of straps 88 are wrapped around shell 16e. To avoid confusing the drawing only two of the straps 88 have been shown in Figs. 8 and 9, but it will be understood that a sufficient number of them are used to substantially cover the full length of shell 16e. The ends of straps 88 are attached to yokes 90 and 92 which are attached to hydraulic cylinders (not shown), or to any mechanism adapted to exert a pull on said straps 88.

Tension is relaxed on yokes 90 and 92 and said yokes are raised or brought together to form a space 94 between the straps 88 and the shell 16e beneath the points where the ends of the straps 88 cross each other. An oxyacetylene burner 96, similar to the burner disclosed in Fig. 7, is then inserted in space 94 and the burner is ignited. The oxyacetylene burner 96 is of such a length, and has a plurality of nozzles spaced therealong, that it is capable of heating a narrow longitudinal strip throughout the full length of shell 16e which is substantially the same width as the longitudinal strip being heated in the modification of Fig. 7. When the strip being heated has reached the desired temperature, approximately 1400° F., the torches are extinguished, burner 96 is removed and the above mentioned hydraulic cylinders, or other mechanism, are actuated to cause yokes 90 and 92 to separate and to draw straps 88 tightly around shell 16e to set up in said shell 16e a compressive force which causes the metal in the heated longitudinal strip to be upset. It may be necessary, or desirable, to heat and cool the first longitudinal strip several times before the straps 88 are tightened, in the manner that the initial circumferential band in Figs. 3 through 6 may be heated and cooled, to raise the temperature of the material adjacent the heated strip to the temperature that it will be after the process has been in operation a period of time and has reached equilibrium.

Following the upsetting of the first longitudinal strip the tension on yokes 90 and 92 is relaxed and they are brought together or lifted to again provide the space 94 between the straps 88 and shell 16e. Shells 10e and 16e are rotated an amount equal to, or slightly less than, the width of the longitudinal strip last upset and the burner 96 is again inserted in the space 94 and the process repeated. The steps of heating and upsetting succeeding longitudinal strips is continued until shell 16e has been upset throughout its circumference.

It will be understood that any desired degree of circumferential compression can be established in 16e by regulating the tension applied to yokes 90 and 92 and thus regulating the amount of upsetting that takes place in shell 16e and this in turn as set forth above determines the circumferential pressure exerted by shell 16e on inner shell 10e.

Figs. 5, 6, 7 and 8, disclose the fabrication of the cylindrical portion of the pressure vessel before the heads are attached thereto. It will be apparent to those skilled in the art that a plurality of layers can be added to shells 10b, or 10e of Figs. 5 and 8, respectively, after heads have been attached thereto, by the methods disclosed in Figs. 5 and 8, respectively.

It will also be understood that multi-layer pressure vessels can be fabricated using all of the modifications disclosed herein. For example, the first two layers could be assembled in the manner disclosed in Fig. 3; the third layer could be added in the manner disclosed in Fig. 5; the fourth layer could be added in the manner disclosed in Fig. 7; and the fifth layer could be added in the manner disclosed in Figs. 8 and 9.

The present invention has been disclosed and described in connection with the fabrication of steel multi-layer pressure vessels. It will be appreciated by those skilled in the art that multi-layer vessels can be formed by means of the herein disclosed process from any thermoplastic material as, for example, metals other than steel, thermoplastic plastics, and glass.

Since certain changes may be made in the above process without departing from the scope of the invention herein involved, it is intended that all matter contained in the above description and shown in the accompanying drawings shall be interpreted as illustrative and not in a limiting sense.

I claim:

1. The method of manufacturing multi-layer high-pressure vessels comprising the steps of providing an inner shell having a predetermined outside diameter, providing an outer shell having an internal diameter greater than said predetermined diameter, locating said inner shell inside of said outer shell, heating a circumferential band of said outer shell having a width not greater than three-quarters of the natural buckling wave length of the material of said outer shell to render it relatively plastic, applying a longitudinal compressive force to said outer shell of sufficient magnitude to upset said heated band by substantially uniform plastic flow to cause the inner surface thereof to contact the outer surface of said inner shell, progressively heating substantially similar circumferential bands along the length of said outer shell, and continuing the application of said longitudinal compressive force to said outer shell to progressively reduce the diameter thereof.

2. The method of manufacturing multi-layer high-pressure vessels comprising the steps of providing an inner shell having a predetermined outside diameter, providing an outer shell having an internal diameter greater than said predetermined diameter, locating said inner shell inside of said outer shell, heating a narrow area of said outer shell having a width not greater than three-quarters of the natural buckling wave length of the material of said outer shell to a temperature whereat it is relatively plastic, applying a compressive stress to said heated area of sufficient magnitude to cause it to upset by substantially uniform plastic flow of the material thereof and the inner surface thereof to contact the outer surface of said inner shell, progressively heating substantially similar succeeding areas of said outer shell, and continuing the application of said compressive stress to progressively upset said outer shell.

3. The method of manufacturing multi-layer high-pressure vessels comprising the steps of providing an inner shell having a predetermined outside diameter, providing an outer shell having an internal diameter greater than said predetermined diameter, locating said inner shell inside of said outer shell, heating a circumferential band of said outer shell having a width not greater than three-quarters of the natural buckling wave length of the material of said outer shell to render it relatively plastic, applying a longitudinal tensile force to said outer shell of sufficient magnitude to elongate said heated band by substantially uniform plastic flow to cause the inner surface thereof to contact the outer surface of said inner shell, progressively heating substantially similar circumferential bands along the length of said outer shell, and continuing the application of said longitudinal tensile force to said outer shell to progressively reduce the diameter thereof.

4. The method of manufacturing multi-layer high-pressure vessels comprising the steps of providing an inner shell having a predetermined outside diameter, providing an outer shell having an internal diameter greater than said predetermined diameter, locating said inner shell inside of said outer shell, heating a narrow area of said outer shell having a width not greater than three-quarters of the natural buckling wave length of the material of said outer shell to a temperature whereat it is relatively plastic, applying tensile stress to said heated area of sufficient magnitude to cause it to elongate by substantially uniform plastic flow of the material thereof and the inner surface thereof to contact the outer surface of said inner shell, progressively heating substantially similar succeeding areas of said outer shell, and continuing the application of said tensile stress to progressively elongate said outer shell.

5. The method of manufacturing multi-layer high-pressure vessels comprising the steps of providing an inner shell having a predetermined outside diameter, providing an outer shell having an internal diameter greater than said predetermined diameter, locating said inner shell inside of said outer shell, heating a narrow area of said outer shell having a width not greater than three-quarters of the natural buckling wave length of the material of said outer shell to a temperature whereat it is relatively plastic, applying stress to said heated area of sufficient magnitude to cause it to deform by substantially uniform plastic flow of the material thereof and the inner surface thereof to contact the outer surface of said inner shell, progressively heating substantially similar succeeding areas of said outer shell, and continuing the application of said stress to progressively deform said outer shell.

DAVID B. ROSSHEIM.

REFERENCES CITED

The following references are of record in the file of this patent:

UNITED STATES PATENTS

| Number | Name | Date |
|---|---|---|
| 464,978 | Mannesman | Dec. 15, 1891 |
| 784,101 | Brinkman | Mar. 7, 1905 |
| 1,743,877 | Broido | Jan. 14, 1930 |
| 1,770,932 | Leake | July 22, 1930 |
| 2,046,503 | Cooper | July 7, 1936 |
| 2,219,085 | Watson | Oct. 22, 1940 |
| 2,273,736 | Raymond et al. | Feb. 17, 1942 |
| 2,309,186 | Goulding | Jan. 26, 1943 |
| 2,342,025 | Watter | Feb. 15, 1944 |
| 2,371,348 | Murray | Mar. 13, 1945 |
| 2,374,771 | Needham | May 1, 1945 |
| 2,376,351 | Gay | May 22, 1945 |
| 2,433,055 | Linden et al. | Dec. 23, 1947 |
| 2,453,079 | Rossman | Nov. 2, 1948 |
| 2,480,774 | Rossheim et al. | Aug. 30, 1949 |